INVENTOR
Carl G. Eisen.

BY Maurice A. Crews
ATTORNEY

June 19, 1956  C. G. EISEN  2,751,480
INDUCTION HEATING APPARATUS AND METHOD
OF HEATING EXTENSIVE SURFACE AREAS
Filed Sept. 1, 1953  4 Sheets-Sheet 4

INVENTOR
Carl G. Eisen.
BY Maurice A. Crews
ATTORNEY

United States Patent Office 2,751,480
Patented June 19, 1956

2,751,480

INDUCTION HEATING APPARATUS AND METHOD OF HEATING EXTENSIVE SURFACE AREAS

Carl G. Eisen, Detroit, Mich., assignor to The Budd Company, Philadelphia, Pa., a corporation of Pennsylvania Application September 1, 1953, Serial No. 377,810

7 Claims. (Cl. 219—10.69)

This invention relates to induction heating apparatus and method of heating extensive surface areas and has for an object the provision of improvements in this art. The invention is particularly adapted for heating an extensive relatively flat annular area and will be specifically described in this connection.

The inductive heating of a flat annular surface has heretofore been effected by the use of a single turn flat electrical induction heating coil using high frequency current. This serves quite well when only a narrow surface is to be heated, but so far as can be learned, there has been but little experience in heating broad flat surfaces except where a long wide strip has been passed beneath the transversely arranged elements of a flat induction heating coil.

The heating of a wide flat surface makes desirable the use of a number of turns arranged in a flat or pancake coil. However, if the turns are placed closely enough together to heat the whole surface uniformly, they have an undesirable heating effect on each other. It is otherwise with cylindrical coils where there is no outer coil surrounding the inner single layer turn of elements and where the combined field of the coil couples interiorly with the blank to be heated throughout the entire circumference. Cylindrical induction heating coils therefore have a high heating efficiency, whereas flat or pancake coils heretofore proposed have a very low efficiency.

According to the present invention the efficiency of a flat pancake type coil is improved until it approaches that of a cylindrical coil. This is accomplished by arranging the turns of the coil longitudinally of and at a small angle with respect to the axis of relative movement which is produced between the coil and the blank and spacing the turns far enough apart and close enough to the blank or workpiece to insure good coupling for heating the workpiece while avoiding mutual coupling and heating between the turns of the coil.

One of the objects of the invention, therefore, is to provide efficient heating by a flat high frequency induction heating coil.

Another object is to provide improved means for heating a relatively flat broad surfaced blank, particularly a flat annular blank.

Another object is to provide an improved method of heating the blank.

The above and other objects and advantages of the invention will be apparent from the following description of an exemplary embodiment, reference being made to the accompanying drawings, wherein.

Figure 1:
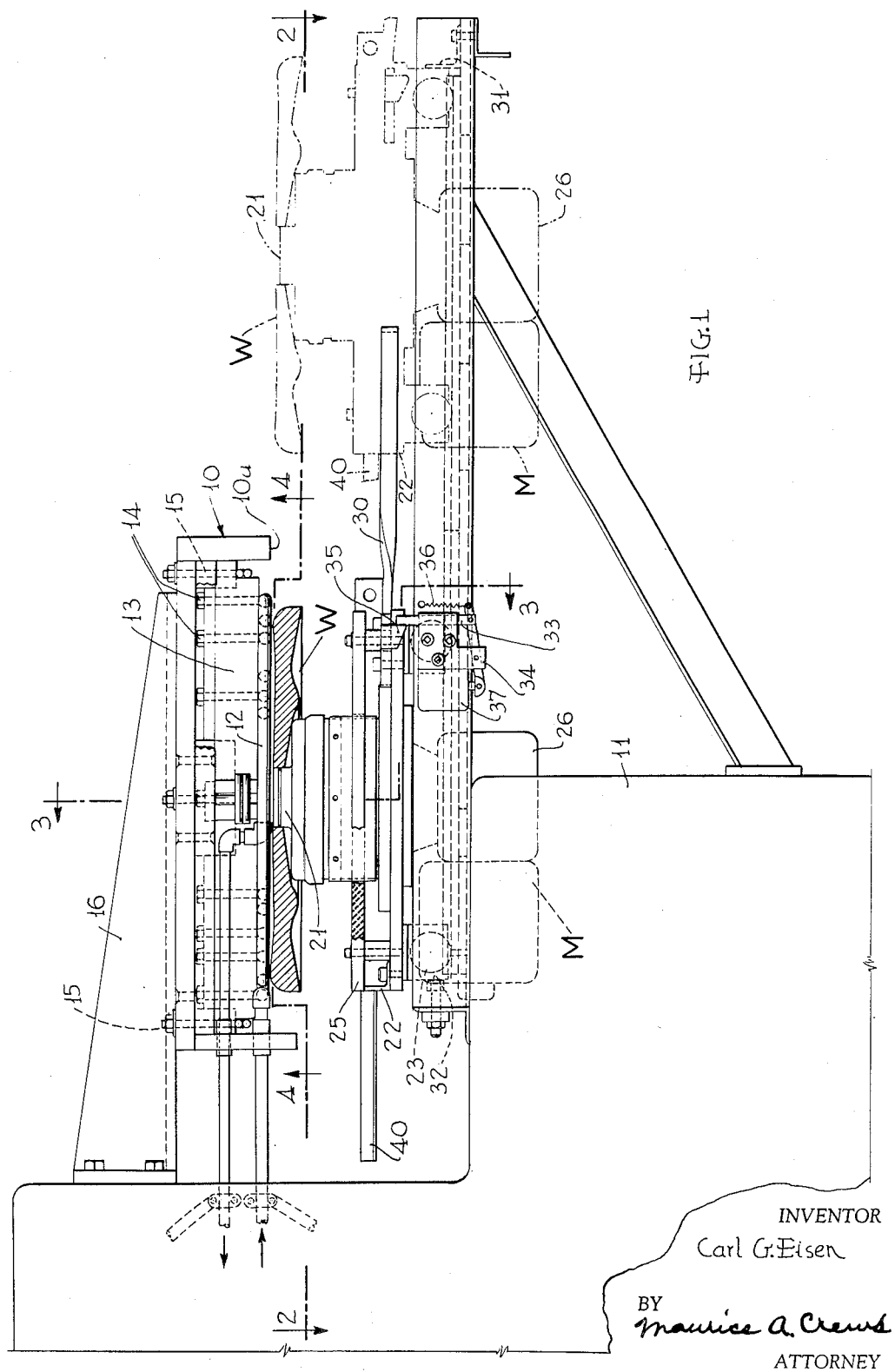
Fig. 1 is a vertical section through a furnace embodying the invention.
Figure 2:
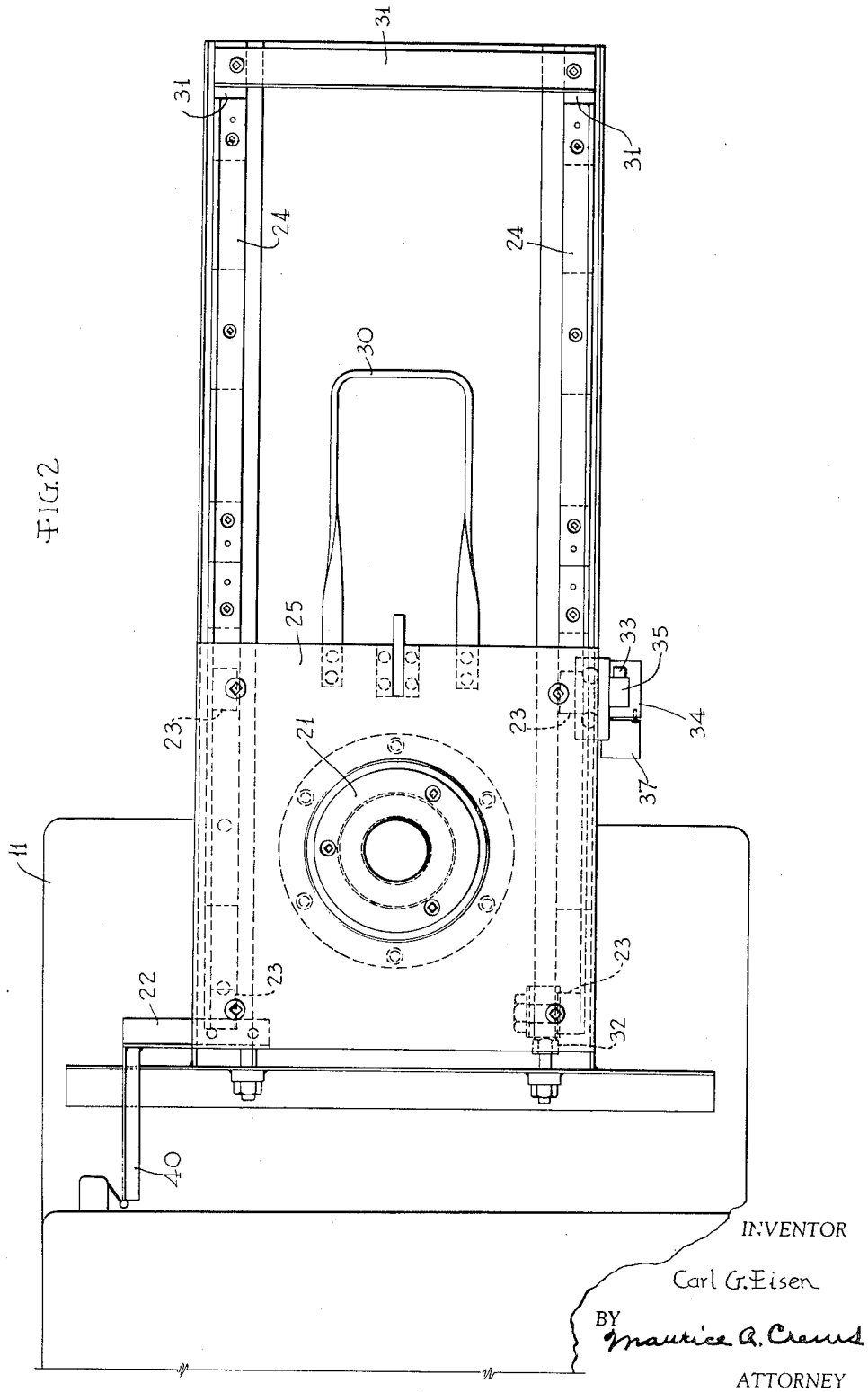
Fig. 2 is a horizontal plan view taken on the line 2—2 of Fig. 1.
Figure 3:
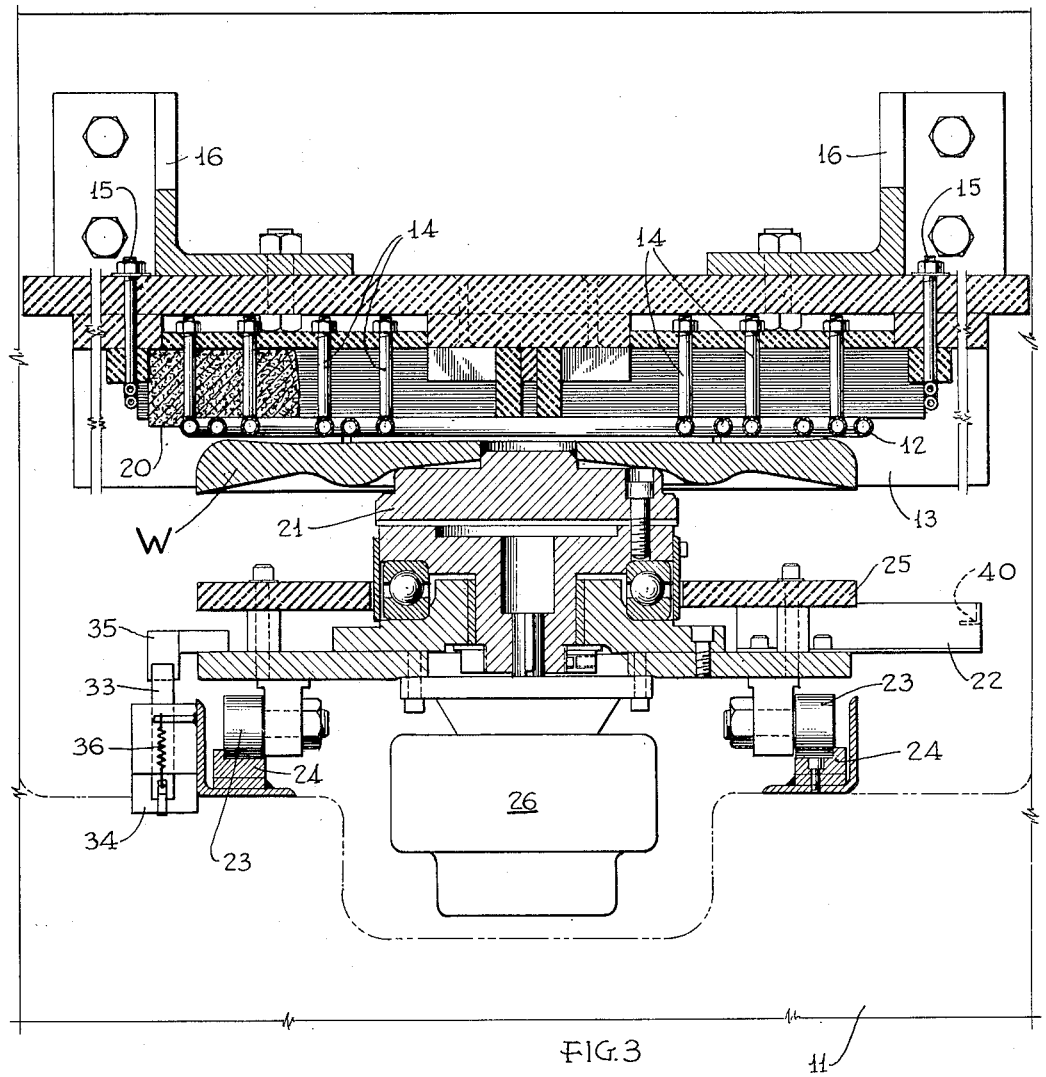
Fig. 3 is a transverse vertical section taken on the line 3—3 of Fig. 1.
Figure 6:
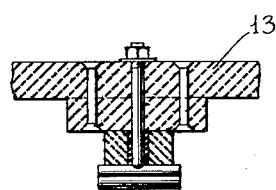
Fig. 6 is a partial enlarged re-inverted section taken on the line 6—6 of Fig. 4.
Figure 7:
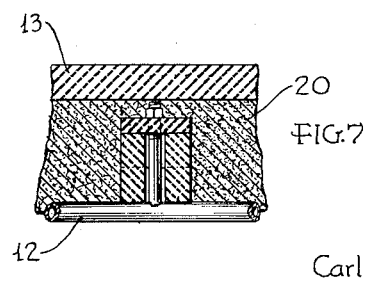
Fig. 7 is a partial enlarged re-inverted section taken on the line 7—7 of Fig. 4.

The heating apparatus comprises an enclosed muffle furnace 10 carried on a base 11. The heating means comprises a pancake type electrical induction heating coil 12 mounted on an insulating frame 13, as by non-magnetic bolts 14, the insulating frame being supported, as by non-magnetic bolts 15 from a non-magnetic bracket 16 secured to an upstanding part of the base 11. The space between the turns of the coil and behind them is packed with refractory insulating filling, such as cement and blocks 20, which confines the heat to the furnace space below the coil and minimizes heating of the coil itself.

The workpiece W to be heated is an annular steel blank which is carried by a rotary spindle or turntable 21 driven by a motor M, the spindle and motor being carried by a carriage 22 mounted by its wheels 23 on track rails 24 extending out the front opening 10a of the furnace. A heat insulating plate 25 minimizes heating of the motor and operating parts from the heated workpiece. A speed reduction gearing unit 26 may be provided between the motor and turntable but the workpiece will still turn at relatively high speed beneath the heating coil.

The carriage is provided with a bail 30 by which it may be moved along the track rails into and out of the furnace. The wheels 23 engage stops 31 at the front end of the rails to limit the forward movement of the carriage and engage adjustable stop screws 32 at the rear end of the rails to limit the rearward movement of the carriage.

A latch pin 33 carried by a support 34 along the track engages a keeper 35 on the carriage to hold the carriage in its rearward position for the workpiece to be heated. The workpiece is introduced and removed when the carriage is at the front end of the track, power means being used if the workpiece is heavy. The latch pin 33 is urged upward by a spring 36 and is pulled down when the workpiece has been heated by a timed magnet 37.

Figure 4:
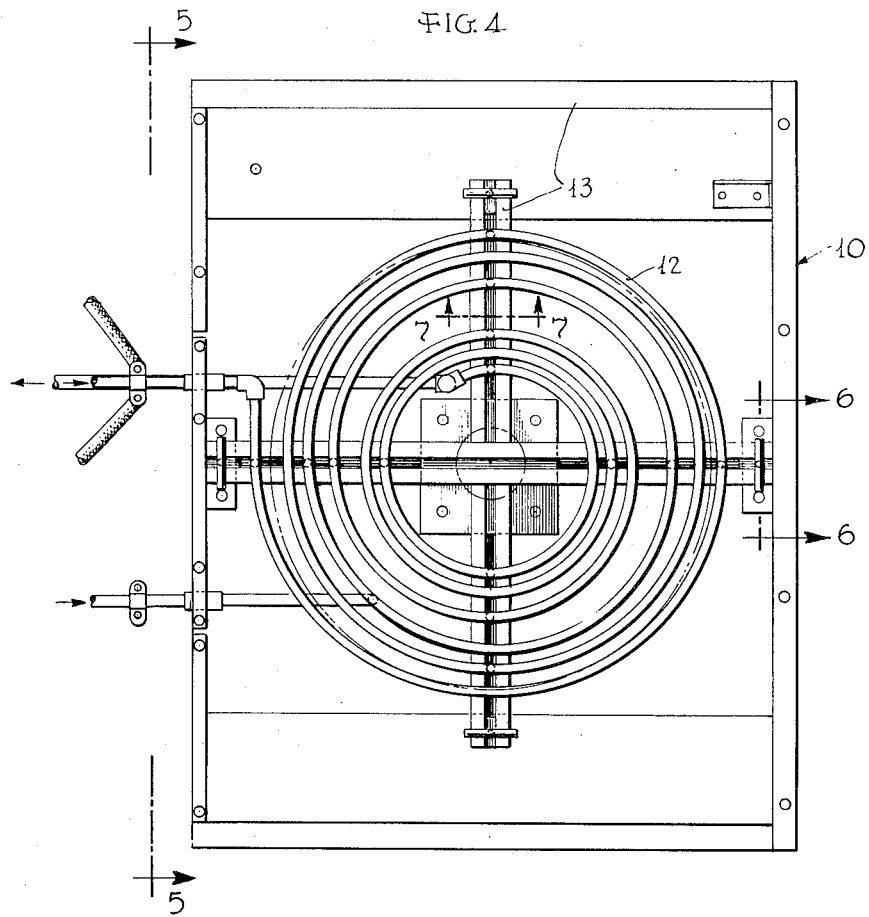
Fig. 4 is an inverted plan view taken on the line 4—4 of Fig. 1.
Figure 5:
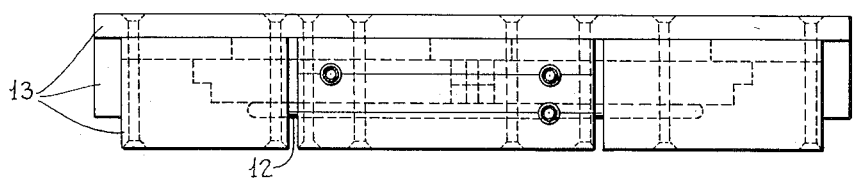
Fig. 5 is a side elevation and section taken on the line 5—5 of Fig. 4.

The turns of the pancake heating coil are disposed very close to the surface of the workpiece, say ⅛" or less, to obtain close coupling and are spaced apart relatively further, say not less than ¼" at any point, to avoid self-coupling heating effects. The workpiece shown has annular portions of different thicknesses and masses and, as shown in Fig. 4, the coil turns are spaced relatively close together where thick sections are to be heated and relatively far apart where thinner sections are to be heated. As shown in Fig. 1, the workpiece W rests on the turntable in practically an annular line of contact so as to minimize transfer of heat to the turntable.

The carriage is provided with a rearward projection 40 to engage a suitable control to cause the turntable motor to be energized when the carriage is in its full rearward position.

Figure 8:
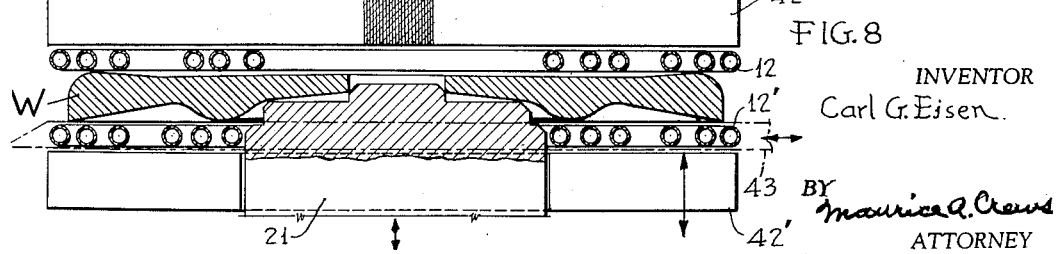
Fig. 8 is a section showing a modification.

If desired, the efficiency of the coil may be increased by confining the outer field, as by a laminated cross-shaped iron core 42, as shown in Fig. 8. Also, if desired, the workpiece may be heated by coils 12 and 12' on both sides, as shown in Fig. 8. For such an arrangement the workpiece may be moved into and out of position between coils by a movable feed device 43 and the turntable run up while turning the workpiece and lowered when the workpiece is being fed in and removed. The lower coil 12' may be moved to clear the feed means 43 until the turntable 21' has risen to support the workpiece and the feed means has moved back out of the way. The required movements are clearly indicated by arrows of movement in Fig. 8.

The operation of the apparatus will be clear from the foregoing description. It is to be especially noted that the turns of the coil run in the direction of movement of elements of the workpiece but at a slight angle to such movement so that there is a constant traversing movement of elements of the workpiece and coil so that all parts of the workpiece are evenly heated without depending upon internal transfer of heat within the workpiece. The heating is too rapid for good internal heat transfer.

While certain embodiments of the invention have been described by way of illustration it is to be understood that there may be various embodiments within the scope of the invention.

What is claimed is:

1. Induction heating apparatus for heating a broad elongated surface of a workpiece, comprising a flat heating coil having elongated heating elements generally aligned with the length of said surface but making a small angle relative to the longitudinal axis thereof, the heating elements being disposed so close to the workpiece and heating so rapidly that local zones of the workpiece would be overheated if the elements and workpiece were kept in the same relative position during the heating period, and means for producing relative longitudinal movement along said longitudinal axis between elements of said workpiece and said heating coil with the heating elements moving obliquely to said longitudinal axis of the elongated surface, whereby the heat of the heating elements is caused to sweep over the surface of the workpiece.

2. Induction heating apparatus for heating a broad elongated surface of a workpiece, comprising a flat heating coil having elongated heating elements generally aligned with the length of said surface but making a small angle relative to the longitudinal axis thereof, the heating elements being disposed so close to the workpiece and heating so rapidly that local zones of the workpiece would be overheated if the elements and workpiece were kept in the same relative position during the heating period, and means for producing relative longitudinal movement along said longitudinal axis between elements of said workpiece and said heating coil whereby the heat of the heating elements is caused to sweep over the surface of the workpiece, the distance between elements of adjacent turns of the coil being greater than the distance between the coil elements and the workpiece, to minimize coupling between heating elements of adjacent turns of the coil.

3. Induction heating apparatus for heating a broad elongated surface of a workpiece, comprising a flat generally annular heating coil having elongated heating elements generally aligned with the circumferential length of said surface but making a small angle relative to the circumferential lines thereof, the heating elements being disposed so close to the workpiece and heating so rapidly that local zones of the workpiece would be overheated if the elements and workpiece were kept in the same relative position during the heating period, and means for producing relative longitudinal movement along said circumferential lines between elements of said workpiece and said heating coil whereby the heat of the heating elements is caused to sweep over the surface of the workpiece, the surface of the workpiece to be heated being annular and the workpiece and coil having rotation relative to each other.

4. Induction heating apparatus for heating a broad elongated surface of a workpiece, comprising a flat heating coil having elongated heating elements generally aligned with the length of said surface but making a small angle relative to the longitudinal axis thereof, and means for producing relative longitudinal movement along said longitudinal axis between elements of said workpiece and said heating coil, the distance between elements of adjacent turns of the coil being greater than the distance between the coil elements and the workpiece, to minimize coupling between heating elements of adjacent turns of the coil, the surface of the workpiece being annular, the coil having spiral turns formed on an axis coinciding with the axis of the workpiece, and the workpiece being rotated on its axis relative to the coil.

5. Induction heating apparatus for heating a broad elongated surface of a workpiece, comprising a flat heating coil having elongated heating elements generally aligned with the length of said surface but making a small angle relative to the longitudinal axis thereof, and means for producing relative longitudinal movement along said longitudinal axis between elements of said workpiece and said heating coil, the distance between elements of adjacent turns of the coil being greater than the distance between the coil elements and the workpiece to minimize coupling between heating elements of adjacent turns of the coil, the surface of the workpiece being annular and the workpiece being thickened at the inner and outer edges of the annular surface, the coil having spiral turns formed on an axis coinciding with the axis of the workpiece, the turns being closer together over said thickened portions of the workpiece, and the workpiece being rotated on its axis relative to the coil.

6. Induction heating apparatus for heating the wide annular surface of an annular workpiece, comprising in combination, a flat spiral pancake induction heating coil formed about a vertical axis and mounted horizontally within a furnace, a track below said coil extending out of the furnace, a carriage mounted to move on said track, and means on said carriage for supporting and rotating the workpiece about the axis of its annular shape beneath said coil with the axis of the workpiece at the axis of the coil.

7. Induction heating apparatus for heating the wide annular surface of an annular workpiece, comprising in combination, a flat spiral pancake induction heating coil formed about a vertical axis and mounted horizontally within a furnace, a track below said coil extending out of the furnace, a carriage mounted to move on said track, means on said carriage for supporting and rotating the workpiece about the axis of its annular shape beneath said coil with the axis of the workpiece at the axis of the coil, and means for latching said carriage at a position along said track at which the axis of the coil and the axis of the workpiece coincide.

References Cited in the file of this patent

UNITED STATES PATENTS

| | | |
|---|---|---|
| 2,421,334 | Kline et al. | May 27, 1947 |
| 2,422,417 | Hutchinson | June 17, 1947 |
| 2,476,935 | Wharff | July 19, 1949 |
| 2,582,438 | Jones | Jan. 15, 1952 |
| 2,598,286 | Mulder et al. | May 27, 1952 |
| 2,618,734 | Anderson | Nov. 18, 1952 |
| 2,643,325 | Body et al. | June 23, 1953 |
| 2,647,200 | Redmond | July 28, 1953 |

FOREIGN PATENTS

| | | |
|---|---|---|
| 626,878 | Great Britain | July 22, 1949 |